(12) United States Patent
Trygubov et al.

(10) Patent No.: US 10,175,453 B2
(45) Date of Patent: Jan. 8, 2019

(54) ASPHERIC APOCHROMATIC OPTICAL SYSTEM

(71) Applicants: Eduard Trygubov, Lakewood, CO (US); Svitlana Trygubova, Lakewood, CO (US)

(72) Inventors: Eduard Trygubov, Lakewood, CO (US); Svitlana Trygubova, Lakewood, CO (US)

(73) Assignees: Eduard Trygubov, Lakewood, CO (US); Svitlana Trygubova, Lakewood, CO (US)

( * ) Notice: Subject to any disclaimer, the term of this patent is extended or adjusted under 35 U.S.C. 154(b) by 0 days.

(21) Appl. No.: 15/822,133

(22) Filed: Nov. 25, 2017

(65) Prior Publication Data

US 2018/0149832 A1    May 31, 2018

Related U.S. Application Data

(60) Provisional application No. 62/427,126, filed on Nov. 28, 2016.

(51) Int. Cl.
*G02B 3/02*         (2006.01)
*G02B 9/10*         (2006.01)
(Continued)

(52) U.S. Cl.
CPC ............. *G02B 9/10* (2013.01); *G02B 13/18* (2013.01); *G02B 27/0025* (2013.01); *G02B 1/02* (2013.01)

(58) Field of Classification Search
CPC ....................................................... G02B 9/10
(Continued)

(56) References Cited

U.S. PATENT DOCUMENTS

| 2,500,046 A | 3/1950 | Schade |
| 2,698,555 A | 1/1955 | McCarthy |

(Continued)

OTHER PUBLICATIONS

A. König, H. Köhler, Die Fernrohre und Entfernungsmesser, 1959, p. 128-135, Springer-Verlag, Berlin, DE.

(Continued)

*Primary Examiner* — James Jones

(57) ABSTRACT

The invention provides an optical imaging lens assembly comprising two lens elements (a positive optical power lens element and a negative optical power lens element) separated by an air gap. The positive lens element of the system may comprise fluorite crystal ($CaF_2$) or other material with similar optical properties. The negative lens element of the system may be made from an optical material, typically glass, having a refractive index $n_e$ that lies within the $1.56 < n_e < 1.70$ range, and having a main dispersion ($n_F - n_C$) within the $0.00860 < (n_F - n_C) < 0.01240$ range. The lens assembly may include at least one aspherical surface. It has been found that a lens assembly in accordance with the present invention, having aspherical surface(s), achieves significant improvements in the Strehl number (equal to or higher than 80%) for the optical systems with focal ratio of between F/12 and F/5 at every wavelength in the 0.435 μm to 0.706 μm range.

20 Claims, 8 Drawing Sheets

FIRST CONFIGURATION SYSTEM

(51) Int. Cl.
*G02B 27/00* (2006.01)
*G02B 13/18* (2006.01)
*G02B 1/02* (2006.01)

(58) Field of Classification Search
USPC .......................................................... 359/717
See application file for complete search history.

(56) References Cited

U.S. PATENT DOCUMENTS

| | | | |
|---|---|---|---|
| 4,400,065 A | 8/1983 | Nagler | |
| 4,854,686 A | 8/1989 | Oda | |
| 4,915,483 A | 4/1990 | Robb | |
| 5,729,390 A | 5/1998 | Abe | |
| 5,973,859 A * | 10/1999 | Abe | G02B 27/0025 359/661 |
| 6,212,016 B1 | 4/2001 | Abe | |

OTHER PUBLICATIONS

J.G. Bakker, Planetary Telescopes, Applied Optics, 1963, p. 111-129, vol. 2, #2, US.

B.L. Nefedov, The Design of Apochromats Made from Two and Three Different Glasses, Soviet Journal of Optical Tech-gy, 1973, p. 46-57, vol. 40, #1, Optical Society of America, US.

P.N. Robb, Selections of Optical Glasses, Applied Optics, 1985, p. 1864-1877, vol. 24, #12, US.

J. Rudenz, A.Karnapp, False Information about Fluorite Objectives?, Scientific Clarification, Jun. 1992, Ref. as/v-stp/2257, Carl Zeiss Jena, DE.

U. Laux, Astrooptik, 1999, p. 49-58, Verlag Sterne und Weltraum, DE.

G.H. Smith, R. Ceragioli, R. Berry, Telescopes, Eyepieces, and Astrograph, 2012, p. 122-130, Willmann-Bell, US.

Takahashi Seisakusho LTD Technical Publication, Fluorite Doublet Apochromat (FC-100, FS-128, FS-150 models), Tokyo, JP.

* cited by examiner

FIRST CONFIGURATION SYSTEM

| y, mm | ZA(y), mm | ΔZ(y), μm |
|---|---|---|
| 0.0 | 0.000000 | - 0.27 |
| 6.5 | 0.039913 | - 0.28 |
| 13.0 | 0.159677 | - 0.32 |
| 19.5 | 0.359360 | - 0.36 |
| 26.0 | 0.639080 | - 0.37 |
| 32.5 | 0.998990 | - 0.34 |
| 39.0 | 1.439280 | - 0.24 |
| 45.5 | 1.960157 | - 0.05 |
| 52.0 | 2.561832 | 0.18 |
| 58.5 | 3.244488 | 0.37 |
| 65.0 | 4.008245 | 0.33 |

| y, mm | ZA(y), mm | ΔZ(y), μm |
|-------|-----------|-----------|
| 0.0   | - 0.000000 | 0.09 |
| 8.5   | - 0.024184 | 0.11 |
| 17.0  | - 0.096746 | 0.17 |
| 25.5  | - 0.217715 | 0.24 |
| 34.0  | - 0.387136 | 0.30 |
| 42.5  | - 0.605059 | 0.30 |
| 51.0  | - 0.871536 | 0.23 |
| 59.5  | - 1.186600 | 0.06 |
| 68.0  | - 1.550239 | - 0.16 |
| 76.5  | - 1.962372 | - 0.30 |
| 85.0  | - 2.422796 | - 0.14 |

| y, mm | ZA(y), mm | ΔZ(y), μm |
|---|---|---|
| 0.0 | 0.000000 | 0.06 |
| 6.5 | 0.039913 | 0.04 |
| 13.0 | 0.159675 | 0.01 |
| 19.5 | 0.359353 | -0.03 |
| 26.0 | 0.639058 | -0.07 |
| 32.5 | 0.998937 | -0.07 |
| 39.0 | 1.439171 | -0.02 |
| 45.5 | 1.959956 | 0.07 |
| 52.0 | 2.561492 | 0.17 |
| 58.5 | 3.243947 | 0.16 |
| 65.0 | 4.007422 | -0.17 |

ASPHERIC APOCHROMATIC OPTICAL SYSTEM

FIELD OF THE INVENTION

The invention comprises an optical lens assembly for imaging, and an optical imaging apparatus. More particularly, the invention provides a lens assembly for optical imaging, with applications in high resolution optical systems for visual and photographic optical systems, including for example telescopes and imaging apparatuses.

BACKGROUND

Development of high resolution optical instruments having optical imaging capabilities has necessitated corresponding developments in high resolution imaging lens assemblies. While high resolution optical imaging lens assemblies are known, such assemblies include a large number of lens elements. Additionally, the prior art lens assemblies generally rely on spherical-surface glass lenses as optical elements, including in certain cases, where two spherical glass lenses may be adhered together to form a doublet to correct chromatic aberration. Certain prior art lens assemblies do comprise two-element lens assemblies—however such two—element lens assemblies either have a lower focal ratio (e.g. F/15 for $CaF_2$ with Schott K7) or a lower Strehl Number ($CaF_2$ and BAK2). Yet further, these prior art arrangements result in complicated and/or relatively expensive manufacturing requirements.

There is accordingly a requirement for optical imaging lens assemblies that work in a relatively wide spectral range and that achieve a reduction in the number of lens elements in medium and large aperture systems, while enable manufacturing efficiencies and simultaneously maintaining image quality.

The present invention addresses this need by providing a novel and inventive lens assembly comprising a two-element lens arrangement configured to deliver high level correction of chromatic aberrations and a Strehl Number of more than 80% within the 0.435-0.706 μm spectral range and having focal ratio within F/5-F/12 range—using aspheric surface or surfaces.

SUMMARY OF THE INVENTION

The invention provides high resolution optical lens assemblies for imaging, and optical imaging apparatuses.

The invention provides an optical imaging lens assembly over 95 mm clear aperture having focal ratio within F/5-F/12 range comprising two lens elements—i.e. a first negative optical power lens element and a second positive optical power lens element, or alternatively a first positive optical power lens element and a second negative optical power lens element. One or more surfaces of one or both of the lenses are aspheric, and the lens assembly is configured to deliver Strehl Number equal to or more than 80% (SN≥0.8), for 0.435-0.706 μm spectral range.

For the purposes of the invention and the present disclosure, (i) lens assembly elements shall be counted from the object side (in the drawings accompanying the specification, from the left side) to the image side (in the drawings attached to the specification, to the right side), (ii) the term "first lens element" (or variants thereof) shall refer to an object side lens element, (iii) the term "second lens element" (or variants thereof) shall refer to an image side lens element, (iv) the "first surface" of a lens element shall refer to an object side surface of the lens element and (v) the "second surface" of a lens element shall refer to an image side surface of the lens element, (vi) f is focal length of the optical imaging lens assembly, (vii) D is clear aperture of the first surface of the first lens element of the optical lens assembly, (viii) $R_1$ is radius of curvature of the first surface of the first lens element, (ix) $R_2$ is radius of curvature of the second surface of the first lens element, (x) $R_3$ is radius of curvature of the first surface of the second lens element, (xi) $R_4$ is radius of curvature of the second surface of the second lens element, (xii) radius of curvature of a surface is positive if its vertex is to the right side from this surface; (xiii) radius of curvature of a surface is negative if its vertex is to the left side from this surface, (xiv) $d_1$ is thickness of the first lens element, (xv) $d_2$ is distance between the second surface of the first lens element and the first surface of the second lens element, (xvi) $d_3$ is thickness of the second lens element, (xvii) p is coefficient binding radii, thickness and outer diameter of the lens (this coefficient connects thickness at the optical axis, thickness on the edge, and radii of double-convex lens to avoid sharp or "negative" thickness at the lens edge. Selection of an appropriate coefficient ensures physically having a lens at full diameter and some thickness at the edge. This coefficient is not needed for double-concave lenses or negative meniscus), (xviii) $D_O$ is outer diameter of the lens, (xix) $n_e$ is refractive index for e spectral line having wavelength 0.54607±0.00001 μm, (xx) $(n_F-n_C)$ is main dispersion for spectral line F having wavelength 0.48613±0.00001 μm wavelength and spectral line C having wavelength 0.65627±0.00001 μm; (xxi) P(e,g), P(e,F), P(e,C) and P(e,r) is the relative partial dispersion of the optical material for corresponding spectral lines, (xxii) $d_1$, $d_2$, and $d_3$ are distances measured between points of intersection of respective lens surfaces and optical axis of the optical lens assembly.

In an embodiment of the invention where an optical imaging lens assembly includes a first (object side) negative optical power element, the lens assembly may be configured to satisfy one or more (and preferably all) of the relations:

$0.3 < R_1/f < 0.95$ $0.16 < R_2/f < 0.22$ $0.15 < R_3/f < 0.23$ $-5.0 < R_4/f < -0.48$ $0.005 < d_2/f < 0.030$ $0.05 D_O < d_1 < 0.2 D_O$ $0.040 < p < 0.080$

In an embodiment of the invention where the optical imaging lens assembly includes a first (object side) positive optical power element, the lens assembly may be configured to satisfy one or more (and preferably all) of the relations:

$0.2 < R_1/f < 0.6$ $-0.27 < R_2/f < -0.21$ $-0.28 < R_3/f < -0.17$ $-25.0 < R_4/f < 53.0$ $0.005 < d_2/f < 0.030$ $0.05 D_O < d_3 < 0.2 D_O$ $0.040 < p < 0.080$

The material of the optical imaging lens assembly elements may be selected according to the following conditions:

The positive optical power lens element is made from calcium fluorite crystal, $CaF_2$ having parameters that satisfy at least one and most preferably both of the following relationships:

$n_e = 1.43494 \pm 0.00005$ $(n_F - n_C) = 0.00457 \pm 0.00003$

In certain embodiments, the positive optical power lens element is made from material having parameters that satisfy at least one and preferably both of the following relationship:

$1.43 < n_e < 1.50$ $0.004 < (n_F - n_C) < 0.007$

The negative optical power lens element is made from glass having parameters that satisfy one or more, and most preferably all of the following relationships:

$1.56 < n_e < 1.70$ $0.0086 < (n_F - n_C) < 0.0124$ $-1.004 < P(e,g) < 0.995$ $--0.459 < P(e,F) < -0.455$ $0.540 < P(e,C) < 0.545$ $0.713 < P(e,r) < 0.720$

In certain embodiments, the optical imaging lens assembly may be implemented as a component ("base assembly") within a more complex lens assembly, comprising one or more additional lens elements as well as the base assembly. In one such embodiment, the equivalent focal distance of the complex lens assembly satisfies the following conditions:

$F_{e1} \leq f$, where $F_{e1}$ is equivalent focal length of the complex assembly when its value is less that focal length of the base assembly or, $f \leq F_{e2}$, where $F_{e2}$ is equivalent focal length of the complex assembly when its value is greater that focal length of the base assembly.

BRIEF DESCRIPTION OF THE ACCOMPANYING DRAWINGS

DETAILED DESCRIPTION OF THE INVENTION

The present invention comprises an optical lens assembly for high resolution imaging, having a reduced number of optical elements, one or more of which optical elements has at least one aspheric surface. The focal ratio (relative aperture) of the optical lens assembly is in the $5 < f/D < 12$ range that corrects chromatic aberration for the range of 0.435-0.706 μm, and in some cases for a wider range of 0.400-0.750 μm. The diameter of the clear aperture of the optical lens assembly is more than 95 mm. The optical lens assembly design delivers Strehl Number (also known as or an attributive brightness) of more than 80% in the ranges recited above i.e., where SN is Strehl Number. Strehl Number (or Strehl Ratio) is a ratio of the center intensity of the aberration pattern, $I_a$ to the central intensity in the unaberrated pattern, $I_o$; $SN = I_a/I_o$. The chromatic aberration correction levels for the two-lens optical lens assemblies/optical systems disclosed in the present application has been found to be at least as good as the correction level in a more complex lens assembly having three or more lenses, as well as the correction level in two-lens systems having a larger f/D ratio.

The lens assemblies/optical systems of the present invention may be advantageously implemented in any long focus optical systems where there is a need of high level correction of chromatic aberrations, like secondary spectrum and spherochromatism (for example in telescopes or long focus imaging systems). The lens assemblies/optical systems of the present invention may be used as a separate or discrete system, for example as collimator lenses, and/or visual systems objective of high power, or as the power component of more complex systems, for example long—focus photo—objectives, and/or high resolution imaging system. These advantageous characteristics are a result of the following design features: the selection of lens material with predetermined values of relative partial dispersion; using meniscus-shape air gap between the lenses limited with close by value radii; as well as the use of higher order aspheric surfaces, that can be applied to any of the four lens surfaces of the system or be distributed between different surfaces of the system.

Figure 1:
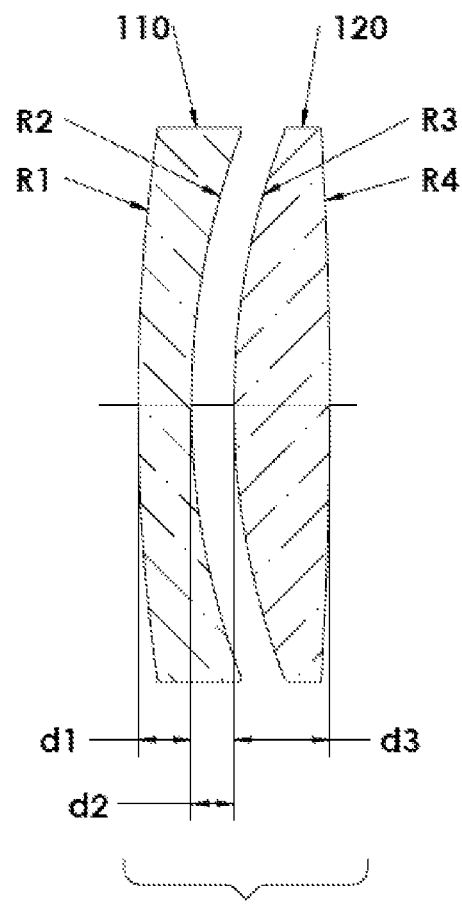
FIG. 01 illustrates a cross-section of the first configuration optical system where the first element is a glass lens and the second is a calcium fluorite crystal lens.

The optical lens assembly of the present invention comprises two optical lens elements in the following two configurations (which differ from each other in terms of different element order):

First configuration of the system: In a first configuration of the system, the optical lens assembly comprises in order from left to right (i.e. from object side to image side), a first negative optical power lens element comprising a negative optical power meniscus lens (i.e. a meniscus lens that is thinner at the center than at the periphery) having a convex first surface and a concave second surface, and a second positive optical power lens element comprising a positive optical power double-convex lens (i.e. a double-convex lens that is thicker at the center than at the periphery) having a convex first and second surfaces. FIG. 01 illustrates this first configuration of the system. As illustrated, in the first configuration the system has the glass lens 110 as the first element (object side element) and the calcium fluorite crystal lens 120 as a second element (image side element).

Figure 2:
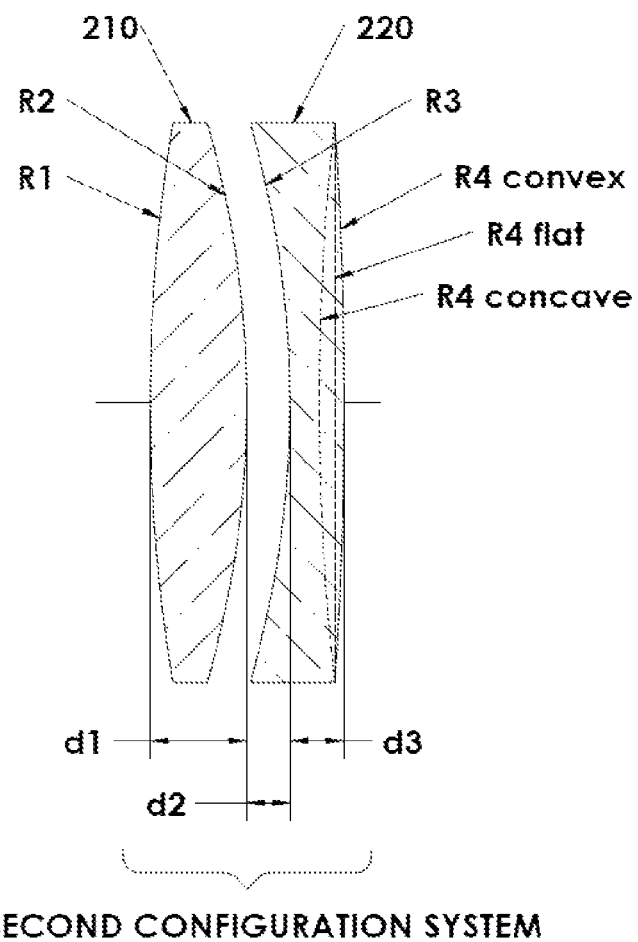
FIG. 02 illustrates a cross-section of the second configuration optical system where the first element is a calcium fluorite crystal lens and the second is a glass lens.

Second configuration of the system: In the second configuration of the system, the optical lens assembly comprises, in order from left to right (i.e. from object side to image side), a first positive optical power lens element comprising a positive optical power double-convex lens (i.e. a double-convex lens that is thicker at the center than at the periphery) having a convex first and second surfaces, and a second negative optical power lens element comprising a negative optical power meniscus (i.e. a lens that is thinner at the center than at the periphery) having a concave first surface and a convex, or concave, or flat second surface. FIG. 02 illustrates the second configuration of the system. As illustrated, in the second configuration, the system has calcium fluorite crystal as the first lens 210 and the second lens 220 is glass.

Optical lens assemblies in accordance with the present invention may be understood in terms of the below parameters. Focal length of the optical assembly is f·D is clear aperture of the first surface of the first element of the optical lens assembly. Assuming the object is at infinity distance, image is formed at the focal plane. Focal length is a distance from a virtual plane to an image plane. The focal length defines the scale of the image. f=h/sin A'. Marginal ray height is h; back aperture angle is A'. Radius of curvature of the first surface of the first lens element is $R_1$. Radius of curvature of the second surface of the first lens element is $R_2$. Radius of curvature of the first surface of the second lens element is $R_3$. Radius of curvature of the second surface of the second lens element is $R_4$. Thickness of the first lens element at the optical axis of the optical lens assembly is $d_1$. The distance between the first lens element and the second lens element along the optical axis of the optical lens assembly is $d_2$. Thickness of the second lens element at the optical axis of the optical lens assembly is $d_3$. It would be understood that all distances discussed above are distances measured between points of intersection of lens surfaces with the optical axis of the optical lens assembly. Lens axial thicknesses for systems of the first and second configurations, $d_1$ and $d_3$, provide small impact to the system correction. The thickness of the lens predetermined only by technology requirements and lens sizes. The axial meniscus-like air gap $d_2$ is important parameter for system correction. Its selection is critical for spherochromatism correction. The air gap value fails into the range from 0.005 to 0.030 of focal length of the optical lens assembly. Both configurations provide a good correction of spherochromatism but have different residual aberrations, as well as limiting characteristics (different limits for aperture for given f/D ratio). The first configuration of the system provides lower values of spherochromatism, but requires bigger values of asphericity to compensate for the higher order spherical aberration; while the second configuration of the system delivers large residual spherochromatism, but smaller value of aspheric. The first configuration of the system has some performance advantages because it ensures reliable protection of the calcium fluorite crystal lens that has small mechanical and thermal strength. Spectral line e adopted as the main wavelength for calculation lens assembly parameters and material optical constants for range of 0.435-0.706 μm. The calculation can be done in a different way where any wavelengths close to e-line can be used as a main wavelength that provides similar results. The refractive index of optical materials for line e (0.54607±0.00001 μm) is $n_e$, for line F (0.48613±0.00001 μm) is $n_F$, for line C (0.65627±0.00001 μm) is $n_C$, for line r (0.70652±0.00001 μm) is $n_r$, and for line g (0.43583±0.00001 μm) is $n_g$. p is coefficient binding radii, thickness and outer diameter of the lens. $D_O$ is outer diameter of the positive optical power lens. Usually outer diameter of the lens is slightly greater than clear aperture to allow lens securing in a lens cell; $D_O>D$; $D_O=D+(1\div 20)$ mm. P (e,g), P (e,F), P (e,C) and P (e,r) are relative partial dispersions of the optical material for corresponding spectral lines.

The optical constants of the positive optical power lens element material may be configured to satisfy following condition:

Constraint 1

$1.43<n_e<1.50$          Constraint 110

$0.004<(n_F-n_C)<0.007$          Constraint 120

In some embodiments optical constants of the positive optical power lens element material may be configured to satisfy following conditions:

Constraint 2:
    The positive optical power lens element in both combinations of the present invention is the calcium fluorite crystal, $CaF_2$ . . . Constraint 210

$n_e=1.43494\pm 0.00005$          Constraint 220

$(n_F-n_C)=0.00457\pm 0.00003$          Constraint 230

The negative optical power lens element in both combinations of the present invention is glass. Optical constants of the negative optical power lens element material may be configured to satisfy following conditions:

$1.56<n_e<1.70$          Constraint 3

$0.00860<(n_F-n_C)<0.01240$          Constraint 4

Constraint 5:

$-1.004<P(e,g)<-0.995$          Constraint 510

$-0.459<P(e,F)<-0.455$          Constraint 520

$0.540<P(e,C)<0.545$          Constraint 530

$0.713<P(e,r)<0.720$          Constraint 540

Where:

$$P(e, g) = \frac{(n_e - n_g)}{(n_F - n_C)};$$

$$P(e, F) = \frac{(n_e - n_F)}{(n_F - n_C)};$$

$$P(e, C) = \frac{(n_e - n_C)}{(n_F - n_C)}; \text{ and}$$

$$P(e, r) = \frac{(n_e - n_r)}{(n_F - n_C)}$$

In an embodiment, at least one lens element surface of the optical lens assembly of the present invention comprises an aspheric surface. In order to correct the spherical aberration for the optical lens assembly and achieve a Strehl Number of 80% or more, the aspherical surface(s) is incorporated or included, or applied on at least one of the four lens surfaces (i.e. at least one of the object side surface and image side surface of the object side lens element and the object side surface and image side surface of the image side lens element) of the optical lens assembly, or may be distributed across any surfaces of the optical lens assembly: $R_1$, and/or $R_2$, and/or $R_3$, and/or $R_4$. The asphericity may be determined from an add-on sphere which is close in value to the radius of the surface where asphericity is applied.

For the purposes of the present invention any aspherical surface can be defined in terms of deviation from a reference spherical surface. The simplest parameter to define asphericity is deviation from a reference spherical surface. In the case of a random sphere selected for the purposes of defining asphericity in terms of deviation from the spherical surface of said random sphere—the deviation could in turn be random and have random values. For the purposes of the present invention, asphericity is sought to be defined with reference to a spherical surface—but in a more predictable manner, for which reason the reference spherical surface is selected such that the largest deviation between the aspherical surface outside of the reference spherical surface and the circumference of the reference spherical surface is equal in absolute value (magnitude) to the largest deviation between the aspherical surface inside of the reference spherical surface and the circumference of the reference spherical surface. It would be understood that for any aspheric surface, there can be only one spherical surface that meets the conditions for qualifying as an add-on sphere. The comparison of deviations from the circumference of the add-on sphere coincides with peak-to-valley definition in optics and can be directly measured.

By using the concept of an add-on sphere for defining asphericity, asphericity may be described or quantified in terms of a specific asphericity deviation from the add-on sphere. It should be understood that there are different methods of choosing the add-on sphere; some of them are: method that provides minimum RMS (root of mean square) of the aspherical deviation from the add-on sphere, method of asphericity deviation minimization on the edge of aspherical surface, method of gradients equalization between the edge and center of the aspheric surface, etc. In an embodiment, the implemented method uses peak-to-valley minimization.

Selection of acceptable asphericity deviation from an add-on sphere in accordance with the present invention may be based on the following constraints:

Constraint 6:
With one aspheric surface in the optical lens assembly the deviation of asphericity from add-on sphere cannot be less than ±0.05 µm . . . Constraint 610, or
With multiple aspheric surfaces in the optical lens assembly the summary of the absolute values of asphericity deviation from each add-on sphere for all the surfaces with aspheric cannot be less than ±0.05 µm . . . Constraint 620

The optical lens assembly of the first configuration of the system with the first negative and second positive optical power elements of the present invention may be configured to satisfy the following constraints:

Constraint 7:

| | |
|---|---|
| $0.3 < \frac{R_1}{f} < 0.95$ | Constraint 710 |
| $0.16 < \frac{R_2}{f} < 0.22$ | Constraint 720 |
| $0.15 < \frac{R_3}{f} < 0.23$ | Constraint 730 |
| $-5.0 < \frac{R_4}{f} < -0.48$ | Constraint 740 |
| $0.005 < \frac{d_2}{f} < 0.030$ | Constraint 750 |
| $0.50 D_O < d_1 < 0.2 D_O$ | Constraint 760 |
| $0.040 < p < 0.080$ | Constraint 770 |

$R_1$, $R_2$, $R_3$, $R_4$—radii of curvature at vertex of surface of the first configuration of the system, with taking into account the rules for positive or negative signs in optics; $d_1$—the axial thickness of the first lens 110; $d_2$—the value of the air gap between the lenses; $d_3$—the axial thickness of the second lens 120; f—system focal length;

p is coefficient binding radii, thickness and outer diameter of the positive optical power lens;

$$p = \frac{d_3}{D_o \left(1 + 2.5 D_o \left(\frac{1}{|R_3|} + \frac{1}{|R_4|}\right)\right)},$$

$D_O$—outer diameter of the positive optical power lens. $R_3$ and $R_4$ are absolute values of the corresponding radii. FIG. 01 illustrates the first configuration optical system.

The optical lens assembly of the second configuration with first positive and second negative optical power elements of the present invention may be configured to satisfy the following constraints:

Constraint 8:

| | |
|---|---|
| $0.2 < \frac{R_1}{f} < 0.6$ | Constraint 810 |
| $-0.27 < \frac{R_2}{f} < -0.21$ | Constraint 820 |
| $-0.28 < \frac{R_3}{f} < -0.17$ | Constraint 830 |
| $-25.0 < \frac{R_4}{f} < 53.0$ | Constraint 840 |

-continued $$0.005 < \frac{d_2}{f} < 0.030 \quad \text{Constraint 850}$$

$$0.05 D_o < d_3 < 0.2 D_o \quad \text{Constraint 860}$$

$$0.040 < p < 0.080 \quad \text{Constraint 870}$$

$R_1$, $R_2$, $R_3$, $R_4$—radii of curvature at vertex of surface of the second configuration of the system, with taking into account the rules for positive or negative signs in optics; $d_1$—the axial thickness of the first lens 210; $d_2$—the value of the air gap between the lenses; $d_3$—the axial thickness of the second lens 220; f—system focal length;

p is coefficient binding radii, thickness and outer diameter of the positive optical power lens;

$$p = \frac{d_1}{D_o\left(1 + 2.5 D_o\left(\frac{1}{|R_1|} + \frac{1}{|R_2|}\right)\right)},$$

$D_O$—outer diameter of the positive optical power lens. $R_1$ and $R_2$ are absolute values of the corresponding radii. Last surface of the system $R_4$ can be convex as shown with the solid line but also can be flat or concave, shown with dotted lines. FIG. 02 illustrates the second configuration optical system.

Figure 3:
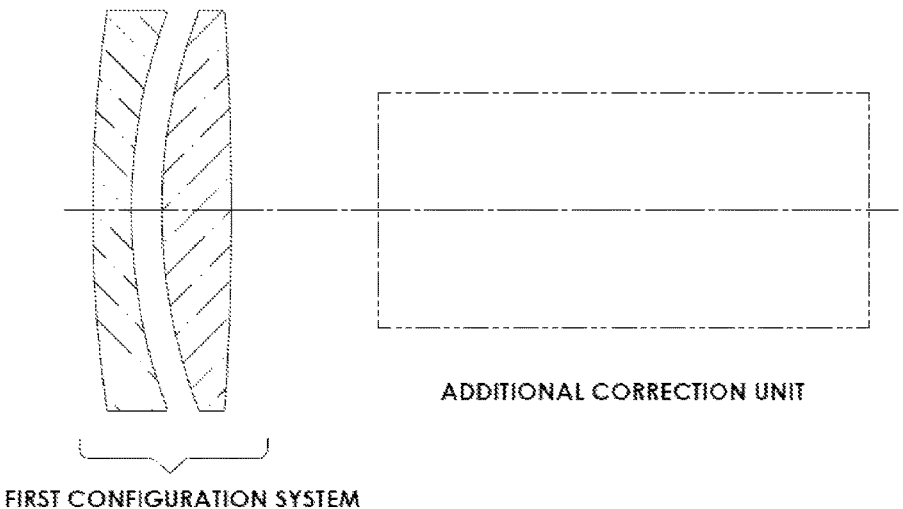
FIG. 03 illustrates a cross-section of the third configuration system that contains the first configuration system and additional optical components.

The optical lens assembly of the present invention comprising either of the first or second configurations of the system satisfying all the above described constraints can be used as a power component of more complex optical systems while maintaining good correction of chromatic aberrations:

Third configuration of the system: In a third configuration of the system, the optical lens assembly comprises, in order from left to right (i.e. from object side to image side), the first configuration optical lens assembly and an additional correction unit containing one or more optical elements. Optical materials and the constants for the first two lenses of the first configuration system, satisfy constraints 1, 2, 3, 4, 5, 6 and 7. FIG. 03 illustrates the third configuration optical system.

Figure 4:
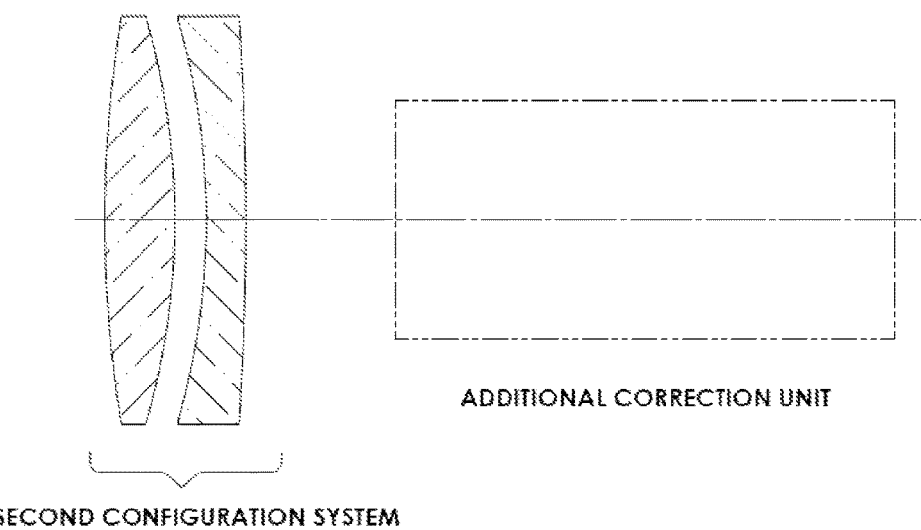
FIG. 04 illustrates a cross-section of the fourth configuration system that contains the second configuration system and additional optical components.

Fourth configuration of the system: In a fourth configuration of the system, the optical lens assembly comprises, in order from left to right (i.e. from object side to image side), the second configuration optical lens assembly and an additional correction unit containing one or more optical elements. Optical materials and the constants for the first two lenses of the second configuration systems, satisfy constraints 1, 2, 3, 4, 5, 6 and 8. FIG. 04 illustrates the fourth configuration optical system.

The additional correction unit added to the basic system of first or second configuration of the system may comprise one or more lenses, depending on the requirements for the correction of the whole system. If the additional correction unit has two or more components, the whole system of first or second configuration provides better correction of aberrations on a larger field of view. The increasing complexity of the system can provide the image quality for a bigger field of view about 2-5 degrees depending on the level of correction, close to the diffraction on a large format CCD (Large Format CCD imagers). Equivalent focal length of the third and fourth configuration systems satisfies the following conditions:

Constraint 9:

$$F_{e1} \leq f \quad \text{Constraint 910, or}$$

$$f \leq F_{e2} \quad \text{Constraint 920}$$

Where $F_{e1}$—equivalent focal length of the third and fourth configuration systems where its value is less that focal length of the first and second configuration systems;

$F_{e2}$—equivalent focal length of the third and fourth configuration systems where its value is greater that focal length of the first and second configuration systems;

f—focal length of the first and second configuration systems.

Thus the correction unit may have positive, negative or zero optical power.

The first, second, third, and forth configuration lens assemblies can be configured to satisfy the following constraints:

D>95 mm, wherein D is a clear aperture of the optical lens assembly . . . Constraint 10

The first configuration lens assembly satisfies constraints 1-7 and 10.

The second configuration lens assembly satisfies constraints 1-6, 8 and 10.

The third configuration lens assembly satisfies constraints 1-7 and 9-10.

The fourth configuration lens assembly satisfies constraints 1-6, 8, and 9-10.

In an example of the first configuration system shown on FIG. 01: optical lens assembly has diameter D=130 mm, $D_O$=135.0 mm, and focal ratio f/D=8. It may be used as a visual apochromatic system and has following parameters:

TABLE 1

Optical parameters of the example of the first configuration system

| Radius, mm | Axial Thickness, mm | Material | Reference $n_e$ |
|---|---|---|---|
| $R_1$ = 529.3 | $d_1$ = 13.0 | SK11 (Schott) | 1.56605 |
| $R_2$ = 192.46 | $d_2$ = 15.66 | | |
| $R_3$ = 195.69 | $d_3$ = 23.4 | CaF$_2$ | 1.43494 |
| $R_4$ = −818.4 | | | |

$R_1$ - surface with aspheric. Focal length: f = 1041.7 mm and reference B.F.L = 1055.4 mm.
B.F.L. - Back Focal Length may be understood as a distance from a vertex of the last surface of the optical lens assembly to a focal plane of the assembly.

The profile of the aspheric surface satisfies the following relationship:

$$ZA(y) = \frac{cy^2}{1 + \sqrt{1 - c^2 y^2}} + (a_1 y^4 + a_2 y^6 + a_3 y^8 + \ldots)$$

Current coordinate of the aspherical profile is ZA(y). Current ray height is y. Curvature of the surface is c; c=1/R. Aspherical coefficients of high order are $a_1$, $a_2$ and $a_3$. It would however be understood that aspheric profiles of the lens elements may be expressed by other appropriate expressions. Taking into account the system parameters, the equation of the aspherical profile is:

$$ZA(y) = \frac{\left(\frac{1}{529.3}\right) y^2}{1 + \sqrt{1 - \left(\frac{1}{529.3}\right)^2 y^2}} +$$

$$(2.6959 * 10^{-10} y^4 - 2.4102 * 10^{-14} y^6 - 3.2371 * 10^{-18} y^8)$$

Figures 5, 6:
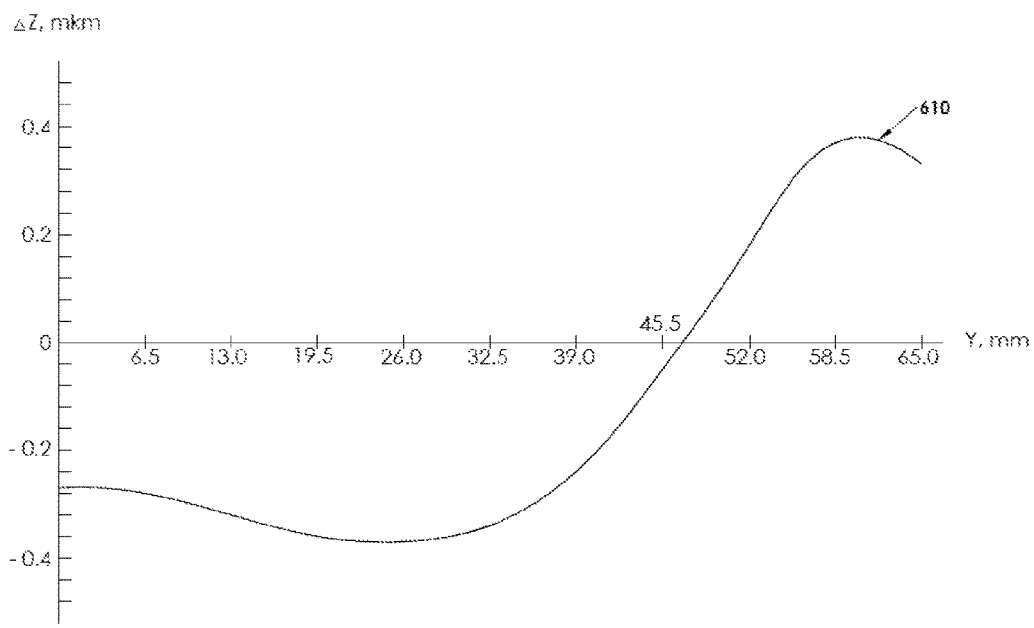
FIG. 05 illustrates a data table of aspheric profile and deviation of the aspherical surface from the add-on sphere of 529.121 mm radius for the example of the first configuration system.
FIG. 06 illustrates graphs of the deviation of aspherical surface from an add-on sphere of 529.121 mm radius for the optical system for the example of the first configuration system.

The aspheric profile of the first surface $R_1$ of the first component 110 calculated from this equation are presented in the first and the second columns of a table of FIG. 05. The third column of this table shows values of aspherical profile deviation from an add-on sphere with 529.121 mm radius which provides minimum peak-to-valley values.

FIG. 06 illustrates a graph 610 of the aspherical profile deviation from an add-on sphere of 529.121 mm radius. The aspheric use for the first configuration system delivers Strehl Number more than 0.8.

Figures 7, 8:
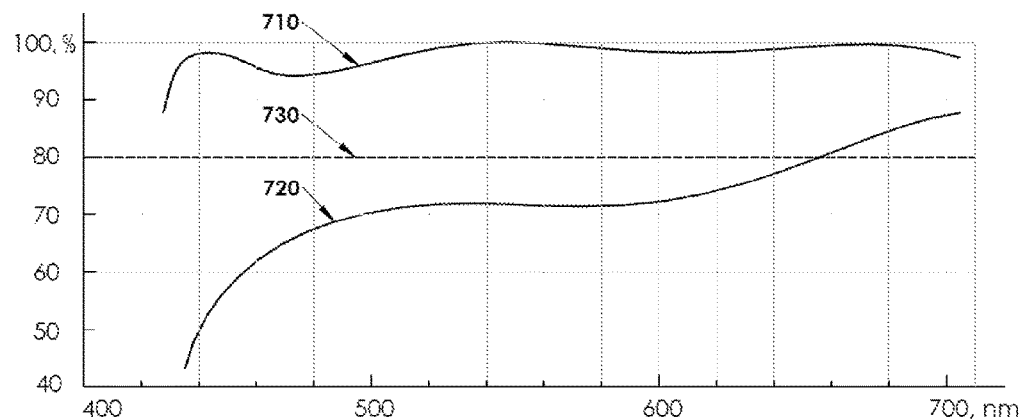
FIG. 07 illustrates Strehl Number graphs for aspherical and spherical configurations for the example of the first configuration system.
FIG. 08 illustrates a data table of aspheric profile and deviation of the aspherical surface from an add-on sphere of (−1492.395) mm radius for the example of the second configuration system.

Graph 710 at FIG. 07 demonstrates Strehl Number, SN≥0.94 for 0.435-0.706 μm range on the optical axis of the lens assembly implementing asphericity. For comparison purposes graph 720 shows the same system without the use of asphericity for the best focal plane (minimum wave aberrations)—and this system does not satisfy the diffraction limit shown by graph 730.

This example of the first configuration lens assembly accordingly satisfies the following constraints 1-7 and 10:
Constraint 1:

$n_e = 1.43494$    Constraint 110:

$(n_F - n_C) = 0.00457$    Constraint 120:

Constraint 2:

the positive lens element is calcium fluorite crystal, $CaF_2$    Constraint 210:

$n_e = 1.43494$    Constraint 220:

$(n_F - n_C) = 0.00457$    Constraint 230:

$n_e = 1.56605$    Constraint 3:

$(n_F - n_C) = 0.00927$    Constraint 4:

Constraint 5:

$P(e,g) = -0.99841$    Constraint 510:

$P(e,F) = -0.45654$    Constraint 520:

$P(e,C) = 0.54345$    Constraint 530:

$P(e,r) = 0.71813$    Constraint 540:

Constraint 6:
Constraint 610: The deviation of asphericity from an add-on sphere is about ±0.37 μm.
Constraint 7:

$\dfrac{R_1}{f} = 0.505$    Constraint 710

$\dfrac{R_2}{f} = 0.184$    Constraint 720

$\dfrac{R_3}{f} = 0.187$    Constraint 730

$\dfrac{R_4}{f} = -0.781$    Constraint 740

$\dfrac{d_2}{f} = 0.015$    Constraint 750

$d_1 = 13.0$ mm    Constraint 760:

$p = 0.055$    Constraint 770:

Constraint 10: D=130 mm

In an example of the second configuration system shown on FIG. 02: optical lens assembly has diameter D=180 mm, $D_O$=186.0 mm and focal ration f/D=8. It may be used as a visual apochromatic system and has following parameters:

TABLE 2

Optical parameters of the example of the second configuration system

| Radius, mm | Axial Thickness, mm | Material | Reference $n_e$ |
|---|---|---|---|
| $R_1$ = 541.3 | $d_1$ = 28.0 | $CaF_2$ | 1.43494 |
| $R_2$ = −348.8 | $d_2$ = 19.42 | | |
| $R_3$ = −348.8 | $d_3$ = 18.0 | N-LaK21 (Schott) | 1.64304 |
| $R_4$ = −1493.8 | | | |

$R_4$ - surface with aspheric. Focal length: f = 1440.2 mm and reference B.F.L = 1356.2 mm.

Taking into account the system parameters, the equation of the aspheric profile is:

$$ZA(y) = \frac{\left(\dfrac{1}{-1498.8}\right)y^2}{1 - \sqrt{1 - \left(\dfrac{1}{-1493.8}\right)^2 y^2}} +$$

$$(-1.242 * 10^{-10} y^4 + 7.931 * 10^{-15} y^6 - 3.619 * 10^{-19} y^8)$$

The aspheric profile of the second surface $R_4$ of the second component 220 calculated from this equation is presented in the first and the second columns of a table of FIG. 08. The third column of this table shows values of aspherical profile deviation from an add-on sphere with (−1492.395) mm radius which provides minimum peak-to-valley values.

Figure 9:
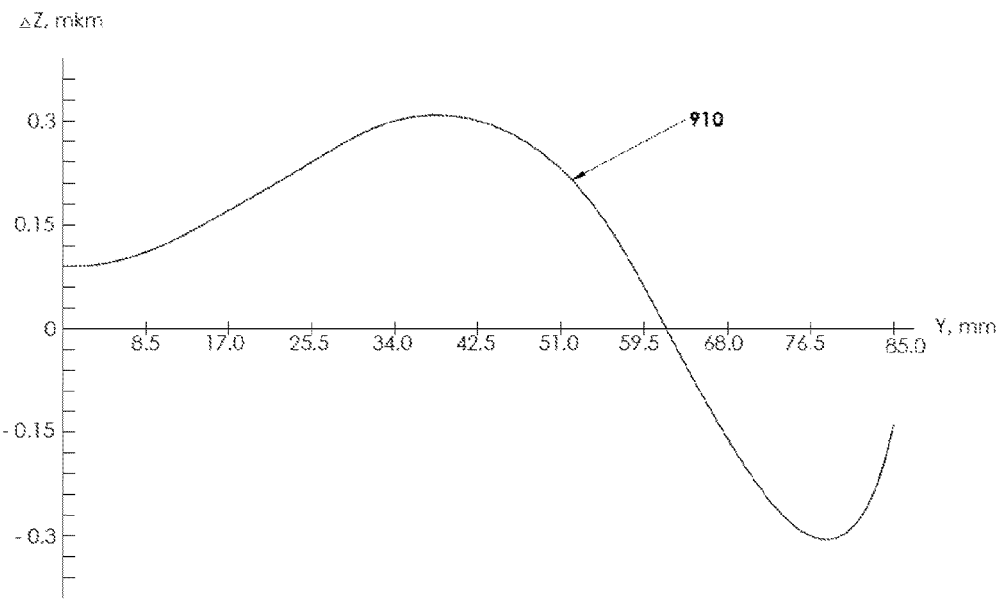
FIG. 09 illustrates graphs of the deviation of aspherical surface from an add-on sphere of (−1492.395) mm radius for the optical system for the example of the second configuration system.

FIG. 09 illustrates a graph 910 of the aspherical profile deviation from an add-on sphere of (−1492.395) mm radius. The implementation of asphericity delivers Strehl Number more than 0.8.

Figure 10:
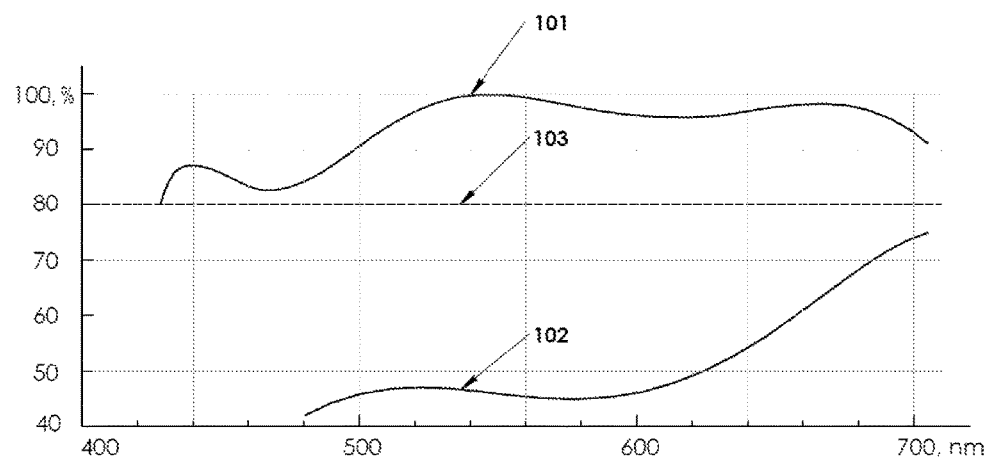
FIG. 10 illustrates Strehl Number graphs for aspherical and spherical configurations for the example of the second configuration system.

Graph 101, FIG. 10 demonstrates Strehl Ratio, SN≥0.82 for 0.435-0.706 μm range on the optical axis of the lens assembly implementing asphericity. For comparison purposes graph 102 shows the same system without the use of asphericity for the best focal plane (minimum wave aberrations)—and this system does not satisfy the diffraction limit shown by graph 103.

This example of the second configuration lens assembly accordingly satisfies the following constraints 1-6, 8 and 10:
Constraint 1:

$n_e = 1.43494$    Constraint 110:

$(n_F - n_C) = 0.00457$    Constraint 120:

Constraint 2:

the positive lens element is calcium fluorite crystal, $CaF_2$    Constraint 210:

$n_e = 1.43494$    Constraint 220:

$(n_F - n_C) = 0.00457$    Constraint 230:

$n_e = 1.64304$    Constraint 3:

$(n_F - n_C) = 0.01066$    Constraint 4:

Constraint 5:

$$P(e,g) = -0.99625 \quad \text{Constraint 510:}$$

$$P(e,F) = -0.45591 \quad \text{Constraint 520:}$$

$$P(e,C) = 0.54441 \quad \text{Constraint 530:}$$

$$P(e,r) = 0.71857 \quad \text{Constraint 540:}$$

Constraint 6:
Constraint 610: The deviation of asphericity from an add-on sphere is about ±0.30 μm.
Constraint 8:

$$\frac{R_1}{f} = 0.376 \quad \text{Constraint 810}$$

$$\frac{R_2}{f} = -0.242 \quad \text{Constraint 820}$$

$$\frac{R_3}{f} = -0.242 \quad \text{Constraint 830}$$

$$\frac{R_4}{f} = -1.037 \quad \text{Constraint 840}$$

$$\frac{d_2}{f} = 0.013 \quad \text{Constraint 850}$$

$$d_1 = 28.0 \text{ mm} \quad \text{Constraint 860}$$

$$p = 0.047 \quad \text{Constraint 870}$$

Constraint 10: D=130 mm

Figures 11, 12:
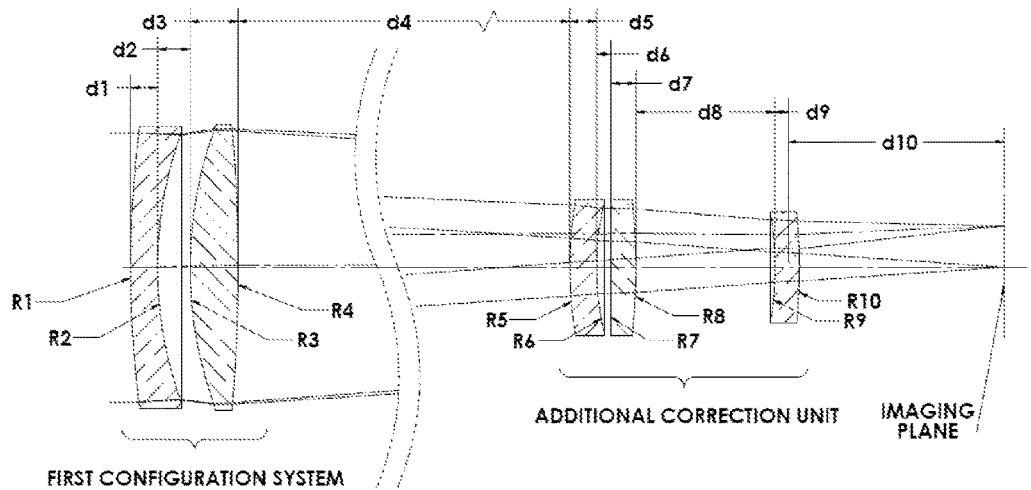
FIG. 11 illustrates the example of the third configuration system.
FIG. 12 illustrates a data table of aspheric profile and deviation of the aspherical surface from an add-on sphere of 529.121 mm radius for the example of the third configuration system.

The third configuration of the system is shown on FIG. 03, with a detailed example of the additional correction unit on FIG. 11: optical lens assembly has diameter D=130 mm, $D_O$=135.0 mm and focal ration f/D=8.2, it contains the base element—i.e. the first configuration of the system with two optical elements) and an additional correction unit with near zero optical power containing three optical elements. All the parameters for the first configuration system were taken from the example of the first configuration system above. It would however be understood that in some cases for better overall correction of the optical assembly the parameters of the base system can be slightly changed but the system still satisfies constraints 1-7 and 10. Here are the parameters of the example of the third configuration of the system:

TABLE 3

Optical parameters of the example of the third configuration system

| Radius, mm | Axial Thickness, mm | Material | Reference $n_e$ |
|---|---|---|---|
| $R_1$ = 529.3 | $d_1$ = 13.0 | SK11 (Schott) | 1.56605 |
| $R_2$ = 192.46 | $d_2$ = 15.66 | | |
| $R_3$ = 195.69 | $d_3$ = 23.4 | CaF$_2$ | 1.43494 |
| $R_4$ = −818.4 | $d_4$ = 850.0 | | |
| $R_5$ = 190.53 | $d_5$ = 12.9 | BaK4 (Schott) | 1.57125 |
| $R_6$ = 137.06 | $d_6$ = 7.0 | | |
| $R_7$ = −29100.0 | $d_7$ = 12.0 | BK7 (Schott) | 1.51872 |
| $R_8$ = −280.22 | $d_8$ = 66.89 | | |
| $R_9$ = −158.76 | $d_9$ = 12.0 | BaK4 (Schott) | 1.57125 |
| $R_{10}$ = −302.42 | | | |

$R_1$ - surface with aspheric. Equivalent focal length: $F_{e2}$ = 1067.9 mm, f = 1041.7 mm reference B.F.L = 98.4 mm.

Taking into account system parameters, the equation of the aspherical profile is:

$$ZA(y) = \frac{\left(\frac{1}{529.3}\right)y^2}{1 + \sqrt{1 - \left(\frac{1}{529.3}\right)^2 y^2}} +$$

$$(2.2051 * 10^{-10} y^4 - 2.2708 * 10^{-14} y^6 - 3.4000 * 10^{-18} y^8)$$

The aspheric profile of the first surface $R_1$ of the first component 110 calculated from this equation are presented in the first and the second columns of a table of FIG. 12. The third column of this table shows values of aspherical profile deviation from an add-on sphere with 529.121 mm radius which provides minimum peak-to-valley values.

Figure 13:
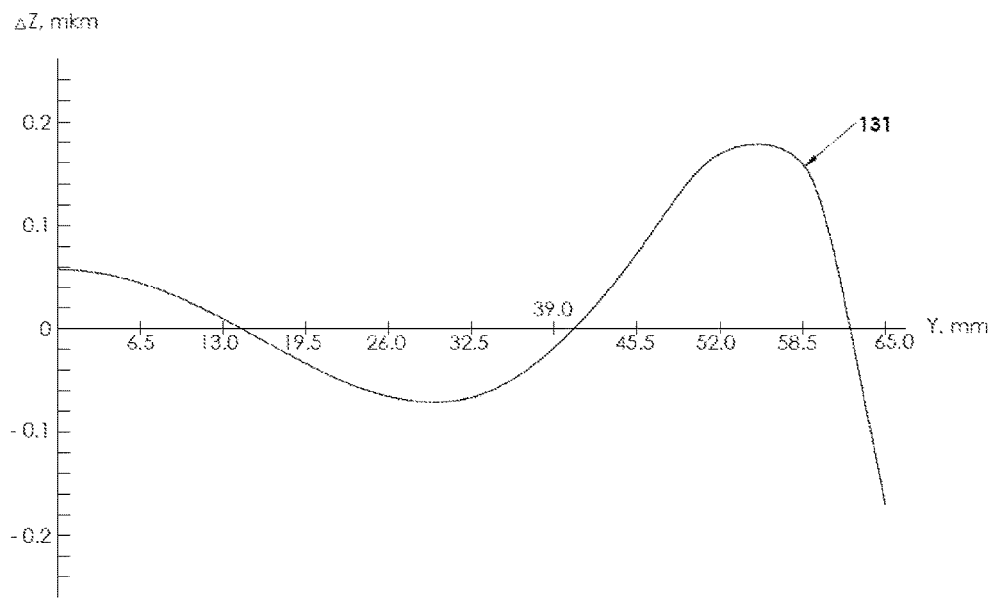
FIG. 13 illustrates graphs of the deviation of aspherical surface from an add-on sphere of 529.121 mm radius for the optical system for the example of the third configuration system.

FIG. 13 illustrates a graph 130 of the aspherical profile deviation from an add-on sphere of 529.121 mm radius.

This system provides better correction of aberrations on a larger field of view than basic first configuration system. Strehl Number for the system for full 2.2 degrees field of view for the spectrum under consideration meets diffraction criteria.

Figure 14:
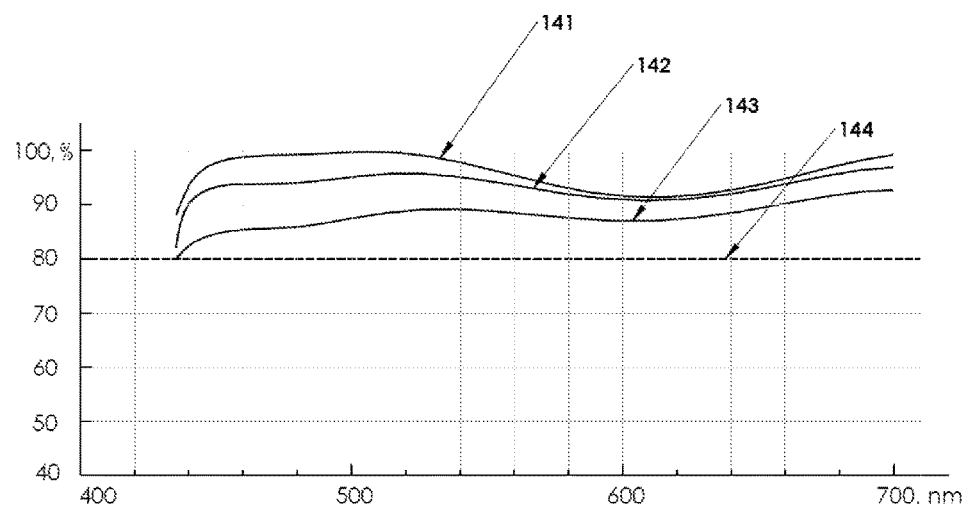
FIG. 14 illustrates Strehl Number graphs for the third configuration system for three different fields of view.

FIG. 14 illustrates the Strehl Number graphs for 0.435-0.706 μm range of three different fields of view of this system example: graph 141—for 0 degrees from optical axis, where SN≥0.87; graph 142—for 0.7 degrees from optical axis, where SN≥0.82; graph 143—for 1.1 degrees from optical axis, where SN≥0.80. Graph 144 represents diffraction limit, Strehl Number is 0.8.

This example of the third configuration lens assembly satisfied constraints 1-7 and 9-10:
Constraint 1:

$$n_e = 1.43494 \quad \text{Constraint 110:}$$

$$(n_F - n_C) = 0.00457 \quad \text{Constraint 120:}$$

Constraint 2:
Constraint 210: the positive lens element is calcium fluorite crystal, CaF$_2$ $$n_e = 1.43494 \quad \text{Constraint 220:}$$

$$(n_F - n_C) = 0.00457 \quad \text{Constraint 230:}$$

$$n_e = 1.56605 \quad \text{Constraint 3:}$$

$$(n_F - n_C) = 0.00927 \quad \text{Constraint 4:}$$

Constraint 5:

$$P(e,g) = -0.99841 \quad \text{Constraint 510:}$$

$$P(e,F) = -0.45654 \quad \text{Constraint 520:}$$

$$P(e,C) = 0.54345 \quad \text{Constraint 530:}$$

$$P(e,r) = 0.71813 \quad \text{Constraint 540:}$$

Constraint 6:
Constraint 610: The deviation of asphericity from an add-on sphere is about ±0.17 μm.
Constraint 7:

$$\frac{R_1}{f} = 0.505 \quad \text{Constraint 710}$$

$$\frac{R_2}{f} = 0.184 \quad \text{Constraint 720}$$

-continued $$\frac{R_3}{f} = 0.187 \quad \text{Constraint 730}$$

$$\frac{R_4}{f} = -0.781 \quad \text{Constraint 740}$$

$$\frac{d_2}{f} = 0.015 \quad \text{Constraint 750}$$

$$d_1 = 13.0 \text{ mm} \quad \text{Constraint 760}$$

$$p = 0.055 \quad \text{Constraint 770}$$

Constraint 9: $F_{e2}$=1067.9 mm and f=1041.7 mm
Constraint 10: D=130 mm

By implementing the teachings and configurations of the present invention, the resulting optical assemblies/systems may be configured to deliver high level correction of chromatic aberrations and a Strehl Number of more than 80% within the 0.435-0.706 µm spectral range and having focal ratio within F/5-F/12 range—using aspheric surface or surfaces.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

We claim:
1. An optical imaging lens assembly comprising:
a positive optical power lens element; and
a negative optical power lens element;
wherein at least one lens surface of the positive optical power lens element or the negative power lens element is an aspherical surface; and
wherein the optical lens assembly is configured such that:

$$D > 95 \text{ mm}, \quad \text{i)}$$

wherein D is a clear aperture of the optical lens assembly; and $$5 < f/D < 12, \quad \text{ii)}$$

wherein f/D is the focal ratio of the optical lens assembly;
wherein the positive optical power lens element is configured such that optical constants corresponding to said positive optical power lens element satisfy the constraints:

$$1.43 < n_{e1} < 1.50; \text{ and} \quad \text{iii)}$$

$$0.004 < (n_{F1} - n_{C1}) < 0.007; \quad \text{iv)}$$

wherein (a) $n_{e1}$ is a refractive index of optical material of the positive optical power lens element for spectral line e, (b) $n_{F1}$ is a refractive index of the optical material of the positive optical power lens element for spectral line F, and (c) $n_{C1}$ is a refractive index of the optical material of the positive optical power lens element for spectral line C;

wherein the negative optical power lens element is configured such that optical constants corresponding to said negative optical power lens element satisfy the constraints:

$$1.51 < n_{e2} < 1.75; \text{ and} \quad \text{v)}$$

$$0.008 < (n_{F2} - n_{C2}) < 0.013; \quad \text{vi)}$$

wherein (d) $n_{e2}$ is a refractive index of optical material of the negative optical power lens element for spectral line e, (e) $n_{F2}$ is a refractive index of the optical material of the negative optical power lens element for spectral line F, and (f) $n_{C2}$ is a refractive index of the optical material of the negative optical power lens element for spectral line C;
wherein the optical imaging lens assembly comprises one or more aspherical lens surfaces, configured such that:
when the optical imaging lens assembly includes only a single aspherical lens surface, aspheric deviation of said single aspheric surface is greater than or equal to ±0.05 µm from a corresponding add-on sphere;
when the optical imaging lens assembly comprises a plurality of aspherical lens surfaces, the cumulative absolute values of asphericity deviation of each aspherical lens surface from a corresponding add-on sphere is greater than or equal to ±0.05 µm; and
for each aspherical lens surface, the corresponding add-on sphere is a reference spherical surface selected such that the largest deviation between the aspherical surface outside of the reference spherical surface and the circumference of the reference spherical surface is equal in absolute value to the largest deviation between the aspherical surface inside of the reference spherical surface and the circumference of the reference spherical surface.

2. The optical imaging lens assembly as claimed in claim 1 wherein optical material of the positive optical power lens element comprises calcium fluorite crystal ($CaF_2$), and wherein optical constants corresponding to said positive optical power lens element satisfy the constraints:

$$n_{e1} = 1.43494 \pm 0.00005; \quad \text{i)}$$

$$(n_{F1} - n_{C1}) = 0.00457 \pm 0.00003; \quad \text{ii)}$$

wherein (a) $n_{e1}$ is a refractive index of optical material of the positive optical power lens element for spectral line e, (b) $n_{F1}$ is a refractive index of the optical material of the positive optical power lens element for spectral line F, and (c) $n_{C1}$ is a refractive index of the optical material of the positive optical power lens element for spectral line C;
and wherein optical material of the negative optical power lens element comprises glass, and wherein optical constants corresponding to said negative optical power lens element satisfy the constraints:

$$1.56 < n_{e2} < 1.70; \quad \text{iii)}$$

$$0.00860 < (n_{F2} - n_{C2}) < 0.01240; \quad \text{iv)}$$

$$-1.004 < P(e2, g2) < -0.995; \quad \text{v)}$$

$-0.459 < P(e2,F2) < -0.455;$    vi)

$0.540 < P(e2,C2) < 0.545;$    vii)

$0.713 < P(e2,r2) < 0.720;$    viii)

wherein:

$$P(e2, g2) = \frac{(n_{e2} - n_{g2})}{(n_{F2} - n_{C2})};$$

$$P(e2, F2) = \frac{(n_{e2} - n_{F2})}{(n_{F2} - n_{C2})};$$

$$P(e2, C2) = \frac{(n_{e2} - n_{C2})}{(n_{F2} - n_{C2})}; \text{ and}$$

$$P(e2, r2) = \frac{(n_{e2} - n_{r2})}{(n_{F2} - n_{C2})};$$

and wherein (a) $n_{e2}$ is a refractive index of optical material of the negative optical power lens element for spectral line e, (b) $n_{F2}$ is a refractive index of optical material of the negative optical power lens element for spectral line F; (c) $n_{C2}$ is a refractive index of optical material of the negative optical power lens element for spectral line C; (d) $n_{r2}$ is a refractive index of the optical material of the negative optical power lens element for spectral line r; (e) $n_{g2}$ is a refractive index of the optical material for spectral line g; (f) P (e2,g2) is the relative partial dispersion of optical material of the negative optical power lens element for spectral lines e and g, (g) P (e2,F2) is the relative partial dispersion of optical material of the negative optical power lens element for spectral lines e and F, (h) P (e2,C2) is the relative partial dispersion of optical material of the negative optical power lens element for spectral lines e and C, and (i) P (e2,r2) is the relative partial dispersion of optical material of the negative optical power lens element for spectral lines e and r.

3. The optical imaging lens assembly as claimed in claim 2, wherein:

the negative optical power lens element comprises a negative meniscus lens having a convex object side surface and a concave image side surface, and is interposed between an object side and the positive optical power lens element of the optical lens assembly; and the positive optical power lens element comprises a positive double-convex lens having a convex object side surface and a convex image side surface; and wherein elements of the optical imaging lens assembly are configured to satisfy the constraints:

i) $0.3 < \dfrac{R_1}{f} < 0.95;$ ii) $0.16 < \dfrac{R_2}{f} < 0.22;$ iii) $0.15 < \dfrac{R_3}{f} < 0.23;$ iv) $-5.0 < \dfrac{R_4}{f} < -0.48;$ v) $0.005 < \dfrac{d_2}{f} < 0.030;$ vi) $0.05 D_O < d_1 < 0.2 D_O;$ and vii) $0.040 < p < 0.080;$ and wherein (a) f is the focal length of the optical lens assembly, (b) $R_1$ is a radius of curvature of the convex object side surface of the negative optical power lens element, (c) $R_2$ is a radius of curvature of the concave image side surface of the negative optical power lens element, (d) $R_3$, is a radius of curvature of the convex object side surface of the positive optical power lens element, and (e) $R_4$ is a radius of curvature of the convex image side surface of the positive optical power lens element, (f) $d_1$ is an axial thickness of the negative optical power lens element, (g) $d_2$ is a width of an air gap between the negative optical power lens element and the positive optical power lens element, (h) $d_3$ is an axial thickness of the positive optical power lens element, (i) p is a coefficient, wherein $$p = \frac{d_3}{D_O\left(1 + 2.5 D_O\left(\frac{1}{|R_3|} + \frac{1}{|R_4|}\right)\right)},$$

and (j) $D_O$ is an outer diameter of the positive optical power lens element, and (k) $R_3$ and $R_4$ are absolute values of the corresponding radii.

4. The optical imaging lens assembly as claimed in claim 2, wherein:

the positive optical power lens element comprises a positive double-convex lens having a convex object side surface and a convex image side surface and is interposed between an object side and the negative optical power lens element of the optical lens assembly; and the negative optical power lens element comprising a negative meniscus lens having a concave object side surface and a concave, convex or flat image side surface; and wherein elements of the optical imaging lens assembly are configured to satisfy the relations:

$0.2 < R_1/f < 0.6;$    i)

$-0.27 < R_2/f < -0.21;$    ii)

$-0.28 < R_3/f < -0.17;$    iii)

$-25.0 < R_4/f < 53.0;$    iv)

$0.005 < d_2/f < 0.030;$    v)

$0.05 D_O < d_3 < 0.2 D_O;$ and    vi)

$0.040 < p < 0.080;$    vii)

and wherein (a) f is the focal length of the optical lens assembly, (b) $R_1$ is a radius of curvature of the convex object side surface of the positive optical power lens element, (c) $R_2$ is a radius of curvature of the convex image side surface of the positive optical power lens element, (d) $R_3$, is a radius of curvature of the concave object side surface of the negative optical power lens element, and (e) $R_4$ is a radius of curvature of the image side surface of the negative optical power lens element, (f) $d_1$ is an axial thickness of the positive optical power lens element, (g) $d_2$ is a width of an air gap between the positive optical power lens element and the negative optical power lens element, (h) $d_3$ is an axial thickness of the negative optical power lens element, (i) p is a coefficient, wherein $$p = \frac{d_1}{D_O\left(1 + 2.5D_O\left(\frac{1}{|R_1|} + \frac{1}{|R_2|}\right)\right)},$$

and (j) $D_O$ is an outer diameter of the positive optical power lens element, and (k) $R_1$ and $R_2$ are absolute values of the corresponding radii.

5. A complex optical imaging lens assembly, comprising the optical lens assembly as claimed in claim 3 and an additional correction unit, positioned on the image side of the positive lens element,
wherein the additional correction unit contains one or more optical elements, and has any one of positive, negative or zero optical power; and
wherein elements of the optical imaging lens assembly are configured to satisfy the constraints:

$F_{e1} \leq f$, or      i)

$f \leq F_{e2}$      ii)

wherein
$F_{e1}$ is an equivalent focal length of the complex lens assembly where its value is less that focal length of the optical lens assembly of claim 3;
$F_{e2}$ is an equivalent focal length of the complex lens assembly where its value is greater that focal length of the optical lens assembly of claim 3; and
f—focal length of the optical lens assembly of claim 3.

6. A complex optical imaging lens assembly, comprising the optical lens assembly as claimed in claim 4 and an additional correction unit, positioned on the image side of the negative lens element,
wherein the additional correction unit contains one or more optical elements, and has any one of positive, negative or zero optical power; and
wherein elements of the optical imaging lens assembly are configured to satisfy one of the relations:

$F_{e1} \leq f$, or      i)

$f \leq F_{e2}$      ii)

wherein
$F_{e1}$ is an equivalent focal length of the complex lens assembly where its value is less that focal length of the optical lens assembly of claim 4;
$F_{e2}$ is an equivalent focal length of the complex lens assembly where its value is greater that focal length of the optical lens assembly of claim 4; and
f is a focal length of the optical lens assembly of claim 4.

7. The optical imaging lens assembly as claimed in claim 1, wherein:
the negative optical power lens element comprises a negative meniscus lens having a convex object side surface and a concave image side surface, and is interposed between an object side and the positive optical power lens element of the optical lens assembly; and
the positive optical power lens element comprises a positive double-convex lens having a convex object side surface and a convex image side surface; and
wherein elements of the optical imaging lens assembly are configured to satisfy the constraints:

i) $0.3 < \frac{R_1}{f} < 0.95$;

ii) $0.16 < \frac{R_2}{f} < 0.22$;

iii) $0.15 < \frac{R_3}{f} < 0.23$;

iv) $-5.0 < \frac{R_4}{f} < -0.48$;

v) $0.005 < \frac{d_2}{f} < 0.030$;

vi) $0.05 D_O < d_1 < 0.2 D_O$; and vii) $0.040 < p < 0.080$;

and wherein (a) f is the focal length of the optical lens assembly, (b) $R_1$ is a radius of curvature of the convex object side surface of the negative optical power lens element, (c) $R_2$ is a radius of curvature of the concave image side surface of the negative optical power lens element, (d) $R_3$ is a radius of curvature of the convex object side surface of the positive optical power lens element, and (e) $R_4$ is a radius of curvature of the convex image side surface of the positive optical power lens element, (f) $d_1$ is an axial thickness of the negative optical power lens element, (g) $d_2$ is a width of an air gap between the negative optical power lens element and the positive optical power lens element, (h) $d_3$ is an axial thickness of the positive optical power lens element, (i) p is a coefficient,
wherein $$p = \frac{d_3}{D_O\left(1 + 2.5D_O\left(\frac{1}{|R_3|} + \frac{1}{|R_4|}\right)\right)},$$

and (j) $D_O$ is an outer diameter of the positive optical power lens element, and (k) $R_3$ and $R_4$ are absolute values of the corresponding radii.

8. The optical imaging lens assembly as claimed in claim 1, wherein:
the positive optical power lens element comprises a positive double-convex lens having a convex object side surface and a convex image side surface and is interposed between an object side and the negative optical power lens element of the optical lens assembly; and
the negative optical power lens element comprising a negative meniscus lens having a concave object side surface and a concave, convex or flat image side surface; and
wherein elements of the optical imaging lens assembly are configured to satisfy the relations:

$0.2 < R_1/f < 0.6$;      i)

$-0.27 < R_2/f < -0.21$;      ii)

$-0.28 < R_3/f < -0.17$;      iii)

$-25.0 < R_4/f < 53.0$;      iv)

$0.005 < d_2/f < 0.030$;      v)

$0.05 D_O < d_3 < 0.2 D_O$; and      vi)

$0.040 < p < 0.080$;      vii)

and wherein (a) f is the focal length of the optical lens assembly, (b) $R_1$ is a radius of curvature of the convex object side surface of the positive optical power lens element, (c) $R_2$ is a radius of curvature of the convex image side surface of the positive optical power lens element, (d) $R_3$, is a radius of curvature of the concave object side surface of the negative optical power lens element, and (e) $R_4$ is a radius of curvature of the image side surface of the negative optical power lens element, (f) $d_1$ is an axial thickness of the positive optical power lens element, (g) $d_2$ is a width of an air gap between the positive optical power lens element and the negative optical power lens element, (h) $d_3$ is an axial thickness of the negative optical power lens element, (i) p is a coefficient, wherein $$p = \frac{d_1}{D_O\left(1 + 2.5 D_O\left(\frac{1}{|R_1|} + \frac{1}{|R_2|}\right)\right)},$$

and (j) $D_O$ is an outer diameter of the positive optical power lens element, and (k) $R_1$ and $R_2$ are absolute values of the corresponding radii.

9. A complex optical imaging lens assembly, comprising the optical lens assembly as claimed in claim 7 and an additional correction unit, positioned on the image side of the positive lens element,
wherein the additional correction unit contains one or more optical elements, and has any one of positive, negative or zero optical power; and
wherein elements of the optical imaging lens assembly are configured to satisfy the constraints:

$F_{e1} \leq f$, or    i)

$f \leq F_{e2}$    ii)

wherein
  $F_{e1}$ is an equivalent focal length of the complex lens assembly where its value is less that focal length of the optical lens assembly of claim 7;
  $F_{e2}$ is an equivalent focal length of the complex lens assembly where its value is greater that focal length of the optical lens assembly of claim 7; and
  f—focal length of the optical lens assembly of claim 7.

10. A complex optical imaging lens assembly, comprising the optical lens assembly as claimed in claim 8 and an additional correction unit, positioned on the image side of the negative lens element,
wherein the additional correction unit contains one or more optical elements, and has any one of positive, negative or zero optical power; and
wherein elements of the optical imaging lens assembly are configured to satisfy one of the relations:

$F_{e1} \leq f$, or    i)

$f \leq F_{e2}$    ii)

wherein
  $F_{e1}$ is an equivalent focal length of the complex lens assembly where its value is less that focal length of the optical lens assembly of claim 8;
  $F_{e2}$ is an equivalent focal length of the complex lens assembly where its value is greater that focal length of the optical lens assembly of claim 8; and
  f is a focal length of the optical lens assembly of claim 8.

11. An optical imaging lens assembly as claimed in claim 1, wherein:
  the optical imaging lens assembly delivers Strehl ratio SN≥0.8, for every wavelength in the range from 0.435 μm to 0.706 μm.

12. An optical imaging lens assembly as claimed in claim 2, wherein:
  the optical imaging lens assembly delivers Strehl ratio SN≥0.8, for every wavelength in the range from 0.435 μm to 0.706 μm.

13. An optical imaging lens assembly as claimed in claim 3, wherein:
  the optical imaging lens assembly delivers Strehl ratio SN≥0.8, for every wavelength in the range from 0.435 μm to 0.706 μm.

14. An optical imaging lens assembly as claimed in claim 4, wherein:
  the optical imaging lens assembly delivers Strehl ratio SN≥0.8, for every wavelength in the range from 0.435 μm to 0.706 μm.

15. An optical imaging lens assembly as claimed in claim 5, wherein:
  the optical imaging lens assembly delivers Strehl ratio SN≥0.8, for every wavelength in the range from 0.435 μm to 0.706 μm.

16. An optical imaging lens assembly as claimed in claim 6, wherein:
  the optical imaging lens assembly delivers Strehl ratio SN≥0.8, for every wavelength in the range from 0.435 μm to 0.706 μm.

17. An optical imaging lens assembly as claimed in claim 7, wherein:
  the optical imaging lens assembly delivers Strehl ratio SN≥0.8, for every wavelength in the range from 0.435 μm to 0.706 μm.

18. An optical imaging lens assembly as claimed in claim 8, wherein:
  the optical imaging lens assembly delivers Strehl ratio SN≥0.8, for every wavelength in the range from 0.435 μm to 0.706 μm.

19. An optical imaging lens assembly as claimed in claim 9, wherein:
  the optical imaging lens assembly delivers Strehl ratio SN≥0.8, for every wavelength in the range from 0.435 μm to 0.706 μm.

20. An optical imaging lens assembly as claimed in claim 10, wherein:
  the optical imaging lens assembly delivers Strehl ratio SN≥0.8, for every wavelength in the range from 0.435 μm to 0.706 μm.

* * * * *